(12) United States Patent
Dersjö et al.

(10) Patent No.: US 10,533,641 B2
(45) Date of Patent: Jan. 14, 2020

(54) TRANSMISSION ARRANGEMENT FOR A VEHICLE

(71) Applicant: VOLVO CONSTRUCTION EQUIPMENT AB, Eskilstuna (SE)

(72) Inventors: Jan Dersjö, Eskilstuna (SE); Per Mattsson, Hindås (SE); Mathias Lehikoinen, Västrås (SE); Mats Åkerblom, Eskilstuna (SE); Jörg Müller, Chemnitz (DE); Mirko Leesch, Gelenau (DE); Rico Resch, Chemnitz (DE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 129 days.

(21) Appl. No.: 15/742,533

(22) PCT Filed: Jul. 10, 2015

(86) PCT No.: PCT/SE2015/050815
§ 371 (c)(1),
(2) Date: Jan. 8, 2018

(87) PCT Pub. No.: WO2017/010919
PCT Pub. Date: Jan. 19, 2017

(65) Prior Publication Data
US 2018/0202518 A1 Jul. 19, 2018

(51) Int. Cl.
*F16H 3/66* (2006.01)
*F16H 37/08* (2006.01)
*F16H 3/44* (2006.01)

(52) U.S. Cl.
CPC ........... *F16H 3/66* (2013.01); *F16H 37/0826* (2013.01); *B60Y 2200/142* (2013.01); *F16H 2003/445* (2013.01); *F16H 2200/0056* (2013.01); *F16H 2200/0065* (2013.01); *F16H 2200/0091* (2013.01); *F16H 2200/0095* (2013.01);
(Continued)

(58) Field of Classification Search
CPC ... F16H 3/66; F16H 2003/445; F16H 37/0826
See application file for complete search history.

(56) References Cited

U.S. PATENT DOCUMENTS 4,683,776 A 8/1987 Klemen
2006/0166779 A1\* 7/2006 Klemen .................... F16H 3/66
475/280

(Continued)

OTHER PUBLICATIONS

European Official Action (dated Feb. 13, 2019) for corresponding European App. 15 898 410.4, (12 pages).
(Continued)

*Primary Examiner* — Mark J Beauchaine
(74) *Attorney, Agent, or Firm* — Sage Patent Group

(57) ABSTRACT

A transmission arrangement for a vehicle includes a first, a second, a third, and a fourth planetary gear set including a sun gear, a planet carrier and a ring gear, respectively, wherein the transmission arrangement further includes a transmission housing, an input shaft and an output shaft, wherein two of the sun gear, the planet carrier and the ring gear of the fourth planetary gear set are each operatively connected to a respective one of the input shaft, the sun gear, the planet carrier and the ring gear of the third planetary gear set.

19 Claims, 4 Drawing Sheets

(52) U.S. Cl.
CPC ............... *F16H 2200/2012* (2013.01); *F16H 2200/2048* (2013.01)

(56) References Cited

U.S. PATENT DOCUMENTS

| | | |
|---|---|---|
| 2007/0072732 A1 | 3/2007 | Klemen |
| 2008/0039266 A1* | 2/2008 | Shim ........................ F16H 3/66 475/280 |
| 2009/0088289 A1 | 4/2009 | Baldwin |
| 2012/0071289 A1* | 3/2012 | Wittkopp .................. F16H 3/66 475/275 |

OTHER PUBLICATIONS

International Search Report (dated Mar. 17, 2016) for corresponding Internaetional App. PCT/2015/050815, (4 pages).

* cited by examiner

TRANSMISSION ARRANGEMENT FOR A VEHICLE

BACKGROUND AND SUMMARY

The present invention relates to a transmission arrangement for a vehicle. The invention also relates to a vehicle comprising such a transmission arrangement. The invention is applicable on vehicles, in particularly working machines such as e.g. wheel loaders, articulated haulers, dump trucks, etc. Although the invention will mainly be described in relation to an articulated hauler, it may also be applicable for other type of vehicles such as e.g. trucks.

In connection with transportation of heavy loads at construction sites or the like, a working machine is often used. The working machines may be utilized for transportations in connection with road or tunnel building, sand pits, mines, forestry and similar environments. Thus, the working machine is frequently operated with large and heavy loads in rough terrain and on slippery ground where no regular roads are present.

In order to fulfil the desired demands from the fields where the working machine is frequently operated, high quality of the vehicle gearbox is necessary. The gearbox is arranged for adjusting the speed and tractive effort of the vehicle in dependency of the specific driving scenario. The gearbox comprises a transmission arrangement and depending on the specific type of gearbox, the transmission arrangement may comprise e.g. ordinary gear sets with cylindrical gear wheels in meshed connection with each other or planetary gear sets comprising a respective sun gear, ring gear and a planet carrier, or a transmission arrangement having a combination of ordinary gear sets and one or more planetary gear sets.

SE 527 108 describes a vehicle transmission arrangement, particularly suitable for working machines. The transmission arrangement in SE 527 108 comprises an input shaft and an output shaft. Five planetary gear sets are arranged between the input shaft and the output shaft for providing the desired gear ratios. Also, the transmission arrangement comprises three clutches and five brakes for achieving the desired gear shifts. Hereby, nine forward gears and four reverse gears are provided for the transmission arrangement in SE 527 108.

Although the transmission arrangement in SE 527 108 provides for a sufficient number of gears, the transmission arrangement is still in need of further improvements in terms of costs and functionality.

It is desirable to provide a transmission arrangement that comprises fewer components and has an improved gear shiftability in comparison to the prior art.

According to a first aspect of the present invention, there is provided a transmission arrangement for a vehicle, the transmission arrangement comprising a first, a second, a third, and a fourth planetary gear set comprising a sun gear, a planet carrier and a ring gear, respectively, wherein said transmission arrangement further comprises a transmission housing, an input shaft and an output shaft, wherein the planet carrier of the first planetary gear set and the output shaft are operatively connected to each other; the ring gear of the first planetary gear set and the planet carrier of the second planetary gear set are operatively connected to each other; the sun gear of the first planetary gear set and the sun gear of the second planetary gear set are operatively connected to each other; the ring gear of the second planetary gear set and the planet carrier of the third planetary gear set are operatively connected to each other, and two of the sun gear, the planet carrier and the ring gear of the fourth planetary gear set are each operatively connected to a respective one of the input shaft, the sun gear, the planet carrier and the ring gear of the third planetary gear set.

The wording "operatively connected to" should in the following and throughout the entire description be interpreted such that the components thereof are fixedly connected to each other, i.e. the rotational speed of the components which are operatively connected to each other is the same. Hence, no connecting mechanism or the like is arranged between the components that are operatively connected to each other and they can therefore not be disengaged from one another during operation. Accordingly, the planet carrier of the first planetary gear set is always connected to the output shaft of the transmission arrangement.

Furthermore, it should be readily understood that the wording "two of the sun gear, the planet carrier and the ring gear of the fourth planetary gear set are each operatively connected to a respective one of the input shaft, the sun gear, the planet carrier and the ring gear of the third planetary gear set" implies that one of the members of the fourth planetary gear set, i.e. the sun gear, the planet carrier or the ring gear, is operatively connected to one of the members of the third planetary gear set or to the input shaft of the transmission arrangement. At the same time, another one of the members of the fourth planetary gear set is operatively connected to another one of the members of the third planetary gear set or to the input shaft of the transmission arrangement.

The advantages of the present invention is that, in comparison to the prior art, only four planetary gear sets are used in order to obtain a sufficient number of forward and reverse gears. This is advantageous both in terms of cost and packaging of the transmission arrangement since the number of components reduces the total cost for the transmission arrangement at the same time as it will be easier to fit the transmission arrangement to a vehicle. The engine compartment is an environment where it often is desirable to reduce the size of the components housed therein and the present invention hence reduces the size of the transmission arrangement by having one less planetary gear set in comparison to the prior art.

Moreover, by means of the present invention, nine forward gears and three reverse gears are obtainable, where the ratios and the steps for the different gears are considered to be able to appropriately operate e.g. a working machine to provide sufficient speed when necessary and sufficient torque when necessary. The ratio and step for the different obtainable gears will be described further below in relation to the detailed description of the present invention.

A still further advantage is that further additional gears and alternative gears relative to the nine forward gears and the three reverse gears described above are obtainable. For example, an additional forward gear and an additional reverse gear are obtainable by means of the present invention. Also, three alternative forward gears and four alternative reverse gears are obtainable by means of the present invention. These additional gears and alternative gears will also be described further below in relation to the detailed description of the present invention.

According to an example embodiment of the present invention, the planet carrier of the second planetary gear set may be selectively connectable to the ring gear of the third planetary gear set. According to an example embodiment, the transmission arrangement may comprise a first connecting mechanism for selectively connecting the planet carrier of the second planetary gear set to the ring gear of the third planetary gear set. The first connecting mechanism may, for example, be a clutch arrangement, such as e.g. a wet or dry friction disc clutch. Other alternatives are of course also conceivable.

The wording "selectively connectable to" should in the following and throughout the entire description be interpreted as an element being connectable at desirable points in time to another element. Hereby, gear shifts of the transmission arrangement can be executed by either connecting or disconnecting elements to/from each other. Components may be selectively connectable to each other by means of connecting mechanisms and controlled by e.g. a control unit or the like. When a connecting mechanism is positioned in an engaged state the components are connected to each other.

According to an example embodiment of the present invention, the sun gear of the third planetary gear set may be selectively connectable to the planet carrier of the second planetary gear set and the ring gear of the first planetary gear set. According to an example embodiment, the transmission arrangement may comprise a second connecting mechanism for selectively connecting the sun gear of the third planetary gear set to the planet carrier of the second planetary gear set and to the ring gear of the first planetary gear set. The second connecting mechanism may, for example, be a clutch arrangement, such as e.g. a wet or dry friction disc clutch. Other alternatives are of course also conceivable.

Hereby, the second planetary gear set has well defined connections to the first and third planetary gear sets.

According to an example embodiment of the present invention, the ring gear of the third planetary gear set may be selectively connectable to the transmission housing. According to an example embodiment, the transmission arrangement may comprise a first locking mechanism for selectively locking the ring gear of the third planetary gear set to the transmission housing. The first locking mechanism may, for example, be a brake arrangement, such as e.g. a wet or dry friction disc brake. Other alternatives are of course also conceivable.

Accordingly, the ring gear of the third planetary gear set can hence be locked to the transmission housing such that the ring gear is prevented from rotating.

According to an example embodiment of the present invention, the planet carrier of the second planetary gear set may be selectively connectable to the transmission housing. According to an example embodiment, the transmission arrangement may comprise a second locking mechanism for selectively locking the planet carrier of the second planetary gear set to the transmission housing. According to an example embodiment, the second locking mechanism may be designed as a dog clutch. Other alternative locking mechanisms are of course also conceivable, such as a wet or dry friction disc brake, etc.

By using a dog clutch design, a durable locking arrangement is provided which is not exposed to friction forces in the same way as a friction disc brake. Hereby, lower drag losses occur when the locking mechanism is disengaged. Accordingly, the planet carrier of the second planetary gear set can be locked to the transmission housing such that the planet carrier is prevented from rotating.

According to an example embodiment of the present invention, the sun gear of the second planetary gear set and the sun gear of the first planetary gear set may be selectively connectable to the transmission housing. According to an example embodiment, the transmission arrangement may comprise a third locking mechanism for selectively locking the sun gear of the second planetary gear set and the sun gear of the first planetary gear set to the transmission housing. The third locking mechanism may, for example, be a brake arrangement, such as e.g. a wet or dry friction disc brake. Other alternatives are of course also conceivable.

Hereby, the sun gear of the second planetary gear set and the sun gear of the first planetary gear set can be locked to the transmission housing such that rotation thereof is prevented.

According to an example embodiment of the present invention, the stationary gear ratio of each one of the first, second and third planetary gear sets may be negative. An advantage is that single planet wheels are used, which reduces cost and gear mesh losses.

According to an example embodiment of the present invention, the sun gear of the fourth planetary gear set may be operatively connected to the ring gear of the third planetary gear set; and the ring gear of the fourth planetary gear set may be operatively connected to the sun gear of the third planetary gear set. According to an example embodiment of the present invention, the input shaft may be selectively connectable to the ring gear of the fourth planetary gear set and the sun gear of the third planetary gear set and selectively connectable to the planet carrier of the fourth planetary gear set. According to an example embodiment of the present invention, the transmission arrangement may comprise a third connecting mechanism for selectively connecting the input shaft to the ring gear of the fourth planetary gear set and to the sun gear of the third planetary gear set, and a fourth connecting mechanism for selectively connecting the input shaft to the planet carrier of the fourth planetary gear set. Throughout the description, the third and fourth connecting mechanisms may, for example, be clutch arrangements, such as e.g. a respective wet or dry friction disc clutch. Other alternatives are of course also conceivable.

The transmission arrangement comprises four connecting mechanisms and three locking mechanisms, i.e. a reduced total number of connecting and locking mechanisms in comparison to the prior art. Also, since both the third and fourth connecting mechanisms are connected to the input shaft, oil supply to each of these connecting mechanisms may be provided through the input shaft.

According to an example embodiment of the present invention, the planet carrier of the fourth planetary gear set may be operatively connected to the input shaft; and the sun gear of the fourth planetary gear set may be operatively connected to the ring gear of the third planetary gear set. According to an example embodiment of the present invention, the sun gear of the third planetary gear set may be selectively connectable to the input shaft and selectively connectable to the ring gear of the fourth planetary gear set. According to an example embodiment of the present invention, the transmission arrangement may comprise a third connecting mechanism for selectively connecting the input shaft to the sun gear of the third planetary gear set, and a fourth connecting mechanism for selectively connecting the ring gear of the fourth planetary gear set to the sun gear of the third planetary gear set.

The transmission arrangement comprises four connecting mechanisms and three locking mechanisms, i.e. a reduced total number of connecting and locking mechanisms in comparison to the prior art.

According to an example embodiment of the present invention, the input shaft may be operatively connected to the planet carrier of the fourth planetary gear set; and the ring gear of the fourth planetary gear set may be operatively connected to the sun gear of the third planetary gear set.

According to an example embodiment of the present invention, the sun gear of the fourth planetary gear set may be selectively connectable to the input shaft and the planet carrier of the fourth planetary gear set and selectively connectable to the ring gear of the third planetary gear set. According to an example embodiment of the present invention, the transmission arrangement may comprise a third connecting mechanism for selectively connecting the sun gear of the fourth planetary gear set to the input shaft and the planet carrier of the fourth planetary gear set, and a fourth connecting mechanism for selectively connecting the sun gear of the fourth planetary gear set to the ring gear of the third planetary gear set.

The transmission arrangement comprises four connecting mechanisms and three locking mechanisms, i.e. a reduced total number of connecting and locking mechanisms in comparison to the prior art.

According to an example embodiment of the present invention, the stationary gear ratio for the fourth planetary gear set may be negative. An advantage is that single planet wheels are used also for the fourth planetary gear set, which reduces cost and gear mesh losses.

According to an example embodiment of the present invention, the planet carrier of the fourth planetary gear set may be operatively connected to the sun gear of the third planetary gear set; and the sun gear of the fourth planetary gear set may be operatively connected to the planet carrier of the third planetary gear set. According to an example embodiment of the present invention, the input shaft may be selectively connectable to the planet carrier of the fourth planetary gear set and the sun gear of the third planetary gear set and selectively connectable to the ring gear of the fourth planetary gear set. According to an example embodiment of the present invention, the transmission arrangement may comprise a third connecting mechanism for selectively connecting the input shaft to the planet carrier of the fourth planetary gear set and to the sun gear of the third planetary gear set, and a fourth connecting mechanism for selectively connecting the input shaft to the ring gear of the fourth planetary gear set.

The transmission arrangement comprises four connecting mechanisms and three locking mechanisms, i.e. a reduced total number of connecting and locking mechanisms in comparison to the prior art. Also, since both the third and fourth connecting mechanisms are connected to the input shaft, oil supply to each of these connecting mechanisms may be provided through the input shaft.

According to an example embodiment of the present invention, the planet carrier of the fourth planetary gear set may be operatively connected to the planet carrier of the third planetary gear set; and the sun gear of the fourth planetary gear set may be operatively connected to the sun gear of the third planetary gear set. According to an example embodiment of the present invention, the input shaft may be selectively connectable to the sun gear of the fourth planetary gear set and the sun gear of the third planetary gear set and selectively connectable to the ring gear of the fourth planetary gear set. According to an example embodiment of the present invention, the transmission arrangement may comprise a third connecting mechanism for selectively connecting the input shaft to the sun gear of the fourth planetary gear set and to the sun gear of the third planetary gear set, and a fourth connecting mechanism for selectively connecting the input shaft to the ring gear of the fourth planetary gear set.

The transmission arrangement comprises four connecting mechanisms and three locking mechanisms, i.e. a reduced total number of connecting and locking mechanisms in comparison to the prior art. Also, since both the third and fourth connecting mechanisms are connected to the input shaft, oil supply to each of these connecting mechanisms may be provided through the input shaft.

According to an example embodiment of the present invention, the stationary gear ratio for the fourth planetary gear set may be positive.

An advantage of having a positive stationary gear ratio for the fourth planetary gear set in combination with operatively connecting the sun gear of the third planetary gear set to the sun gear of the fourth planetary gear set, and operatively connecting the planet carrier of the third planetary gear set to the planet carrier of the fourth planetary gear set is that third and fourth planetary gear sets can be designed as a compound planetary gear set of Ravigneaux type. A Ravigneaux type compound planetary gear set may be more cost efficient and arranged in a more compact design compared to two separate planetary gear sets.

According to a second aspect of the present invention, there is provided a vehicle comprising a prime mover and a gearbox, wherein the gearbox comprises a transmission arrangement according to any of the above example embodiments described in relation to the first aspect of the present invention.

Effects and features of the second aspect of the present invention are largely analogous to those described above in relation to the first aspect of the present invention.

Further features of, and advantages with, the present invention will become apparent when studying the appended claims and the following description. The skilled person realize that different features of the present invention may be combined to create embodiments other than those described in the following, without departing from the scope of the present invention.

Definitions

The relationship between the rotational speeds of the different members in a planetary gear set is defined according to the following:

$$\frac{\omega_S - \omega_P}{\omega_R - \omega_P} = R \quad \text{(Eq. 1)}$$

wherein
$\omega_S$ is the speed of rotation of the sun gear;
$\omega_P$ is the speed of rotation of the planet carrier;
$\omega_R$ is the speed of rotation of the ring gear; and
R is the stationary gear ratio of the planetary gear set.

As used herein, the expression "stationary gear ratio" R for a planetary gear set is defined as the ratio of the speed of rotation of the sun gear to the speed of rotation of the ring gear in a situation in which the planet carrier is stationary, i.e.:

$$R = -\frac{z_R}{z_S} \text{ for single planet gear wheels} \quad \text{(Eq. 2)}$$

and $$R = +\frac{z_R}{z_S} \text{ for double planet gear wheels} \quad \text{(Eq. 3)}$$

wherein $z_R$ is the number of teeth of the ring gear; and $z_S$ is the number of teeth of the sun gear.

In a similar manner, the expression "ratio" for a transmission arrangement should be understood to relate to the number of revolutions of the input shaft of the transmission arrangement divided by the number of revolutions of the output shaft of the transmission arrangement. Furthermore, the expression "step" should be understood to mean the quotient achieved when the ratio of a gear is divided by the ratio of an adjacent gear of a transmission arrangement.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION

Figure 1:
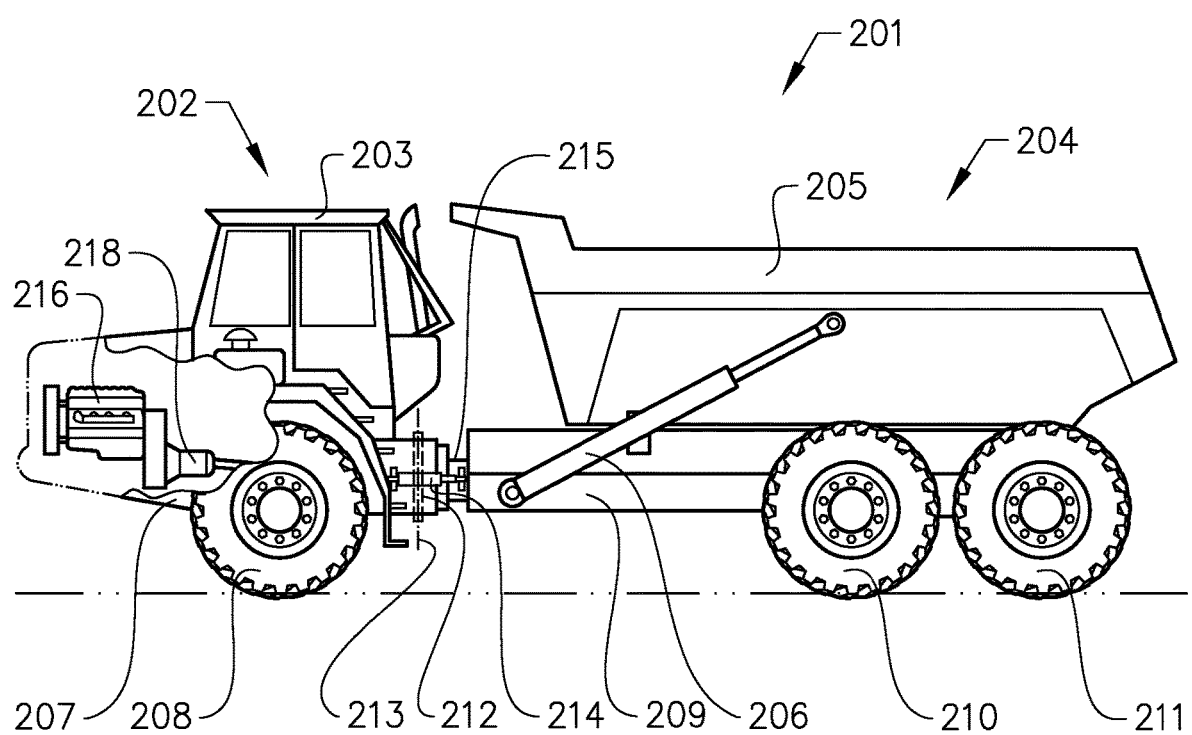
FIG. 1 is a lateral side view illustrating a working machine in the form of an articulated hauler.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

FIG. 1 is a side view of a working machine 201 in the form of an articulated hauler having a tractor unit 202 with a cab 203 for a driver and a trailer unit 204 with a platform having a dump body 205, here in the form of a container, arranged thereon, for receiving load. The dump body 205 is preferably pivotally connected to the rear section and tiltable by means of a pair of tilting cylinders 206, for example hydraulic cylinders. The tractor unit 202 has a frame 207 and a pair of wheels 208 suspended from the frame 207. The trailer unit 204 has a frame 209 and two pair of wheels 210, 211 suspended from the frame 209.

The working machine is frame-steered, i.e. there is a joint arrangement 212 connecting the tractor unit 202 and the trailer unit 204 of the working machine 201. The tractor unit 202 and the trailer unit 204 are pivotally connected to each other for pivoting around a substantially vertical pivot axis 213.

The working machine preferably comprises a hydraulic system having two hydraulic cylinders 214, steering cylinders, arranged on opposite sides of the working machine for turning the working machine by means of relative movement of the tractor unit 202 and the trailer unit 204. The hydraulic cylinders can, however, be replaced by any other linear actuator for steering the machine, such as an electromechanical linear actuator.

Furthermore, the articulated hauler comprises a prime mover 216, here illustrated as an internal combustion engine, and a gearbox 218 having a transmission arrangement according to any one of the embodiments described below in relation to FIGS. 2-6.

Figure 2:
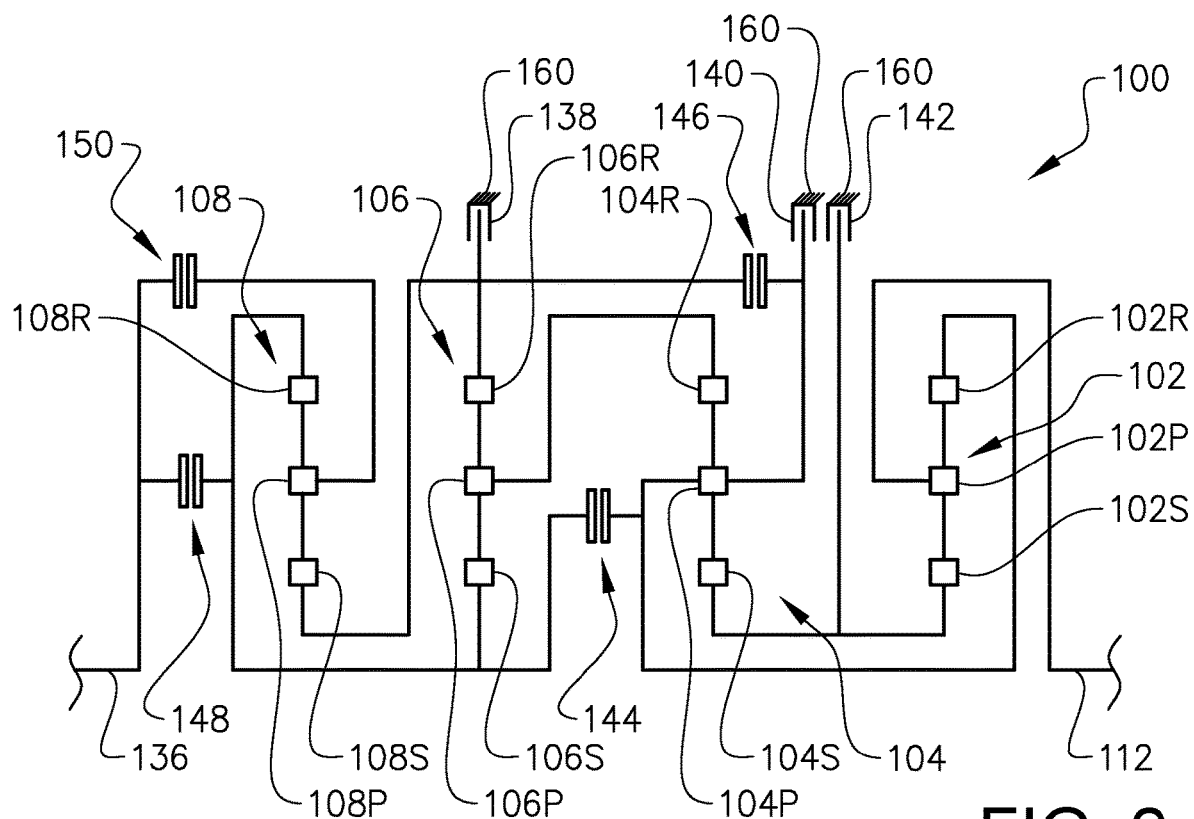
FIGS. 2-6 schematically illustrate transmission arrangements according to example embodiments of the present invention.

Now, with reference to FIG. 2, an example embodiment of a transmission arrangement 100 according to the present invention is illustrated. The transmission arrangement 100 comprises a first planetary gear set 102 comprising a sun gear 102S, a planet carrier 102P and a ring gear 102R, a second planetary gear set 104 comprising a sun gear 104S, a planet carrier 104P and a ring gear 104R, a third planetary gear set 106 comprising a sun gear 106S, a planet carrier 106P and a ring gear 106R, and a fourth planetary gear set 108 comprising a sun gear 108S, a planet carrier 108P and a ring gear 108R. The transmission arrangement 100 further comprises an input shaft 136 for receiving a rotary motion/torque from the prime mover 216 of the vehicle 201 and an output shaft 112 for providing a rotary motion/torque to the driven wheels of the vehicle 201.

The different members of the planetary gear sets 102, 104, 106, 108 of the transmission arrangement 100, i.e. the sun gear, the planet carrier and the ring gear, are in the example embodiment depicted in FIG. 2 configured according to the following. It should be readily understood that the different members described below are connected to each other, either directly, i.e. operatively connected, or via a connecting mechanism, i.e. selectively connectable. The members can be operatively connected to each other by means of e.g. a connector element. Such connector element can be e.g. a solid shaft, a hollow shaft or a drum, or other suitable element for connecting two members to each other, which elements are known to the person skilled in the art. Hence, no explicit explanation is given below in regards to the means connecting the members to each other.

The planet carrier 102P of the first planetary gear set 102 is operatively connected to the output shaft 112 of the transmission arrangement 100, i.e. the planet carrier 102P is at all times directly connected to the output shaft 112 of the transmission arrangement 100. Further, the ring gear 102R of the first planetary gear set 102 is operatively connected to the planet carrier 104P of the second planetary gear set 104. The sun gear 102S of the first planetary gear set 102 is operatively connected to the sun gear 104S of the second planetary gear set 104. Furthermore, the sun gear 102S of the first planetary gear set 102 and the sun gear 104S of the second planetary gear set 104 are selectively connectable to a transmission housing 160 of the transmission arrangement 100 by means of a third locking mechanism 142. Hence, the third locking mechanism 142, when being engaged, initially reduces the rotational speed of the respective sun gears 102S, 104S, and thereafter locks the respective sun gears 102S, 104S to the transmission housing.

The ring gear 104R of the second planetary gear set 104 is operatively connected to the planet carrier 106P of the third planetary gear set 106. Furthermore, the planet carrier 104P of the second planetary gear set 104 is selectively connectable to the sun gear 106S of the third planetary gear set 106 by means of a second connecting mechanism 144. The second connecting mechanism 144 can be a clutch arrangement which is either a wet clutch or a dry clutch. Furthermore, the planet carrier 104P of the second planetary gear set 104 is also selectively connectable to the ring gear 106R of the third planetary gear set 106 by means of a first connecting mechanism 146. The first connecting mechanism 146 can be a clutch arrangement which is either a wet clutch or a dry clutch. Moreover, the planet carrier 104P of the second planetary gear set 104 is selectively connectable to the transmission housing 160 by means of a second locking mechanism 140. Hence, the second locking mechanism 140, when being engaged, locks the planet carrier 104P to the transmission housing 160. The second locking mechanism 140 may, for example, be designed as a dog clutch.

The sun gear 106S of the third planetary gear set 106 is operatively connected to the ring gear 108R of the fourth planetary gear set 108. The ring gear 106R of the third planetary gear set 106 is operatively connected to the sun gear 108S of the fourth planetary gear set 108. The ring gear 106R of the third planetary gear set 106 and the sun gear 108S of the fourth planetary gear set 108 are selectively connectable to the transmission housing 160 by means of a first locking mechanism 138. Hence, the first locking mechanism 138, when being engaged, initially reduces the rotational speed of the ring gear 106R and the sun gear 108S, and thereafter locks the ring gear 106R and the sun gear 108S to the transmission housing 160.

Finally, the input shaft 136 is selectively connectable to the ring gear 108R of the fourth planetary gear set 108 and to the sun gear 106S of the third planetary gear set 106 by means of a third connecting mechanism 148, and selectively connectable to the planet carrier 108P of the fourth planetary gear set 108 by means of a fourth connecting mechanism 150. The third 148 and the fourth 150 connecting mechanisms can be a respective clutch arrangement which is either a wet clutch or a dry clutch.

According to the example embodiment depicted in FIG. 2, the stationary gear ratio of each one of the first 102, second 104, third 106, and fourth 108 planetary gear sets are negative. According to a non-limiting example, the stationary gear ratio for each of the planetary gear sets may be as described below in Table 1.

TABLE 1

Exemplary stationary gear ratios for the embodiment depicted in FIG. 2.

| First planetary gear set (102) | Second planetary gear set (104) | Third planetary gear set (106) | Fourth planetary gear set (108) |
|---|---|---|---|
| −2.825 | −1.625 | −1.700 | −2.650 |

Figure 3:
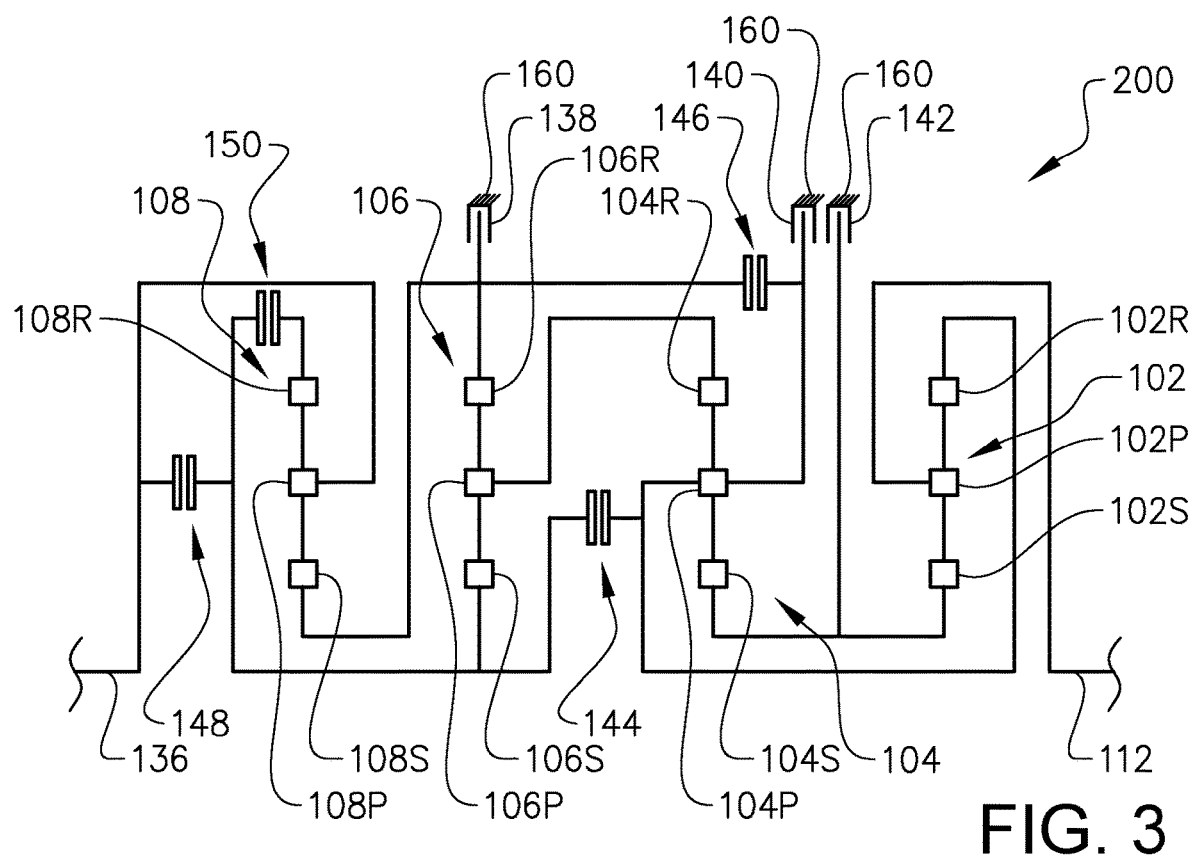

With reference to FIG. 3, another example embodiment of the transmission arrangement 200 is depicted. The transmission arrangement 200 of the example embodiment depicted in FIG. 3 is in many ways similar to the transmission arrangement 100 depicted in FIG. 2. Therefore, the following will mainly describe those parts that differ from the transmission arrangement 100 in FIG. 2.

The planet carrier 108P of the fourth planetary gear set 108 is operatively connected to the input shaft 136 of the transmission arrangement 200. Moreover, the ring gear 106R of the third planetary gear set 106 is operatively connected to the sun gear 108S of the fourth planetary gear set 108. Further, the sun gear 106S of the third planetary gear set 106 is selectively connectable to the input shaft 136 by means of a third connecting mechanism 148, and selectively connectable to the ring gear 108R of the fourth planetary gear set 108 by means of a fourth connecting mechanism 150.

According to the example embodiment depicted in FIG. 3, the stationary gear ratio of each one of the first 102, second 104, third 106, and fourth 108 planetary gear sets are negative. According to a non-limiting example, the stationary gear ratio for each of the planetary gear sets may be as described below in Table 2.

TABLE 2

Exemplary stationary gear ratios for the embodiment depicted in FIG. 3.

| First planetary gear set (102) | Second planetary gear set (104) | Third planetary gear set (106) | Fourth planetary gear set (108) |
|---|---|---|---|
| −2.825 | −1.625 | −1.700 | −2.650 |

Figure 4:
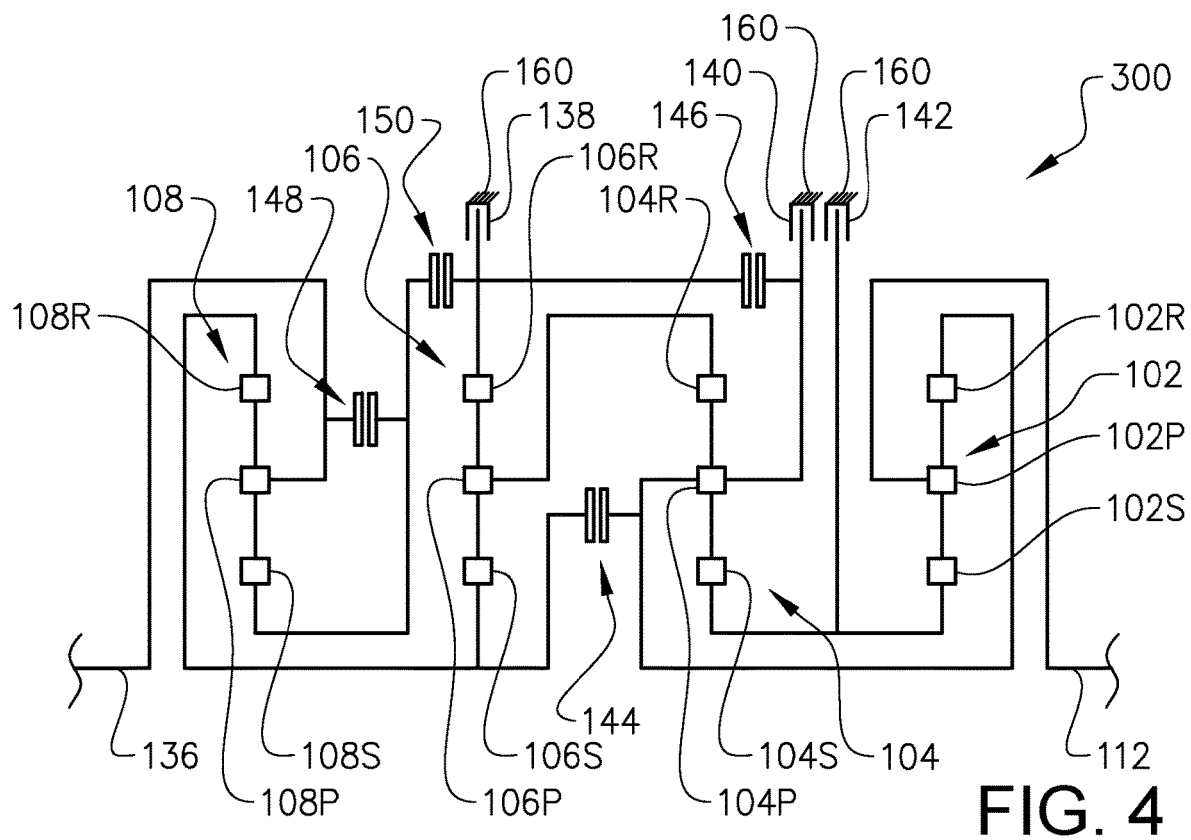

With reference to FIG. 4, another example embodiment of the transmission arrangement 300 is depicted. The transmission arrangement 300 of the example embodiment depicted in FIG. 4 is in many ways similar to the transmission arrangements depicted in FIGS. 2 and 3. Therefore, the following will mainly describe the differences compared to those transmission arrangements.

The sun gear 106S of the third planetary gear set 106 is operatively connected to the ring gear 108R of the fourth planetary gear set 108. Also, the planet carrier 108P of the fourth planetary gear set 108 is operatively connected to the input shaft 136 of the transmission arrangement 300. Furthermore, the sun gear 108S of the fourth planetary gear set 108 is selectively connectable to the input shaft 136 and to the planet carrier 108P of the fourth planetary gear set 108 by means of a third connecting mechanism 148. Finally, the ring gear 106R of the third planetary gear set 106 is selectively connectable to the sun gear 108S of the fourth planetary gear set 108 by means of a fourth connecting mechanism 150.

According to the example embodiment depicted in FIG. 4, the stationary gear ratio of each one of the first 102, second 104, third 106, and fourth 108 planetary gear sets are negative. According to a non-limiting example, the stationary gear ratio for each of the planetary gear sets may be as described below in Table 3.

TABLE 3

Exemplary stationary gear ratios for the embodiment depicted in FIG. 4.

| First planetary gear set (102) | Second planetary gear set (104) | Third planetary gear set (106) | Fourth planetary gear set (108) |
|---|---|---|---|
| −2.825 | −1.625 | −1.700 | −2.650 |

Figure 5:
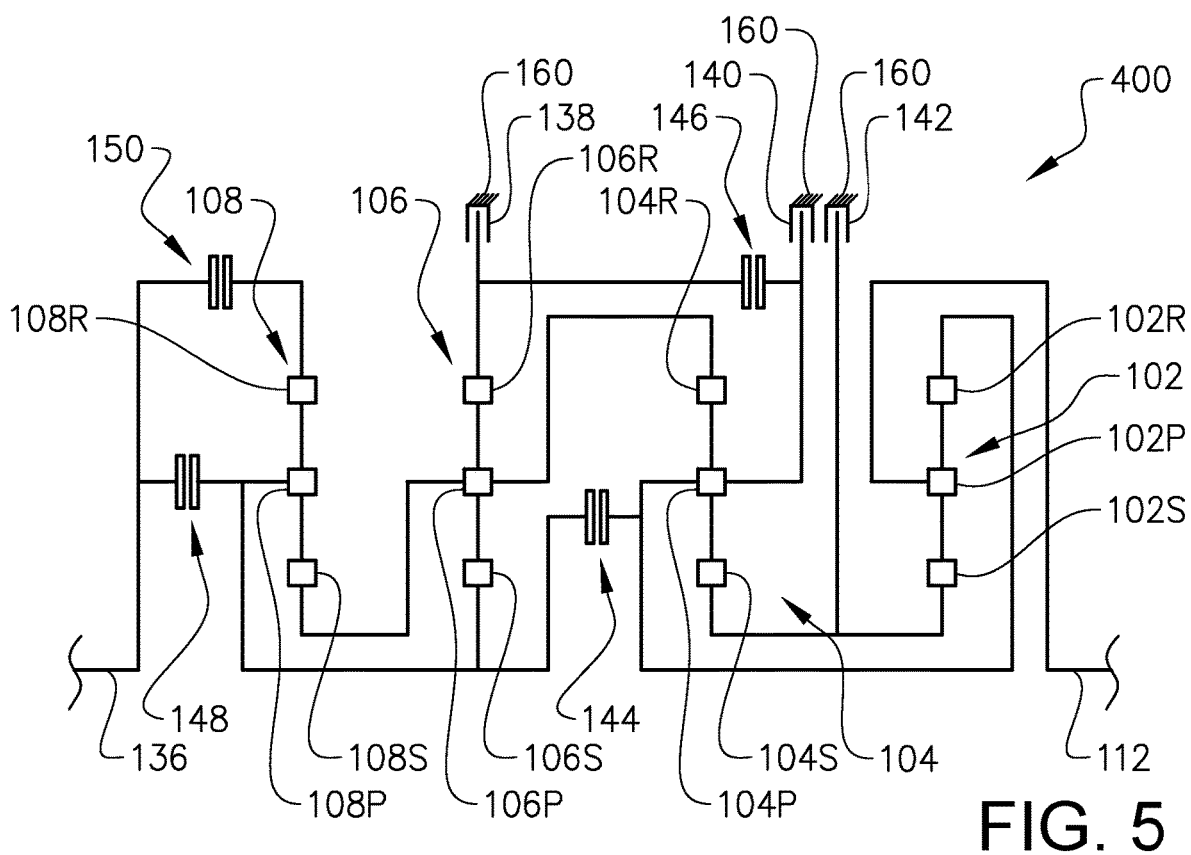

With reference to FIG. 5, another example embodiment of the transmission arrangement 400 is depicted. The transmission arrangement 400 of the example embodiment depicted in FIG. 5 is in many ways similar to the transmission arrangements described above and the following will therefore mainly describe the differences compared to those transmission arrangements.

The sun gear 106S of the third planetary gear set 106 is operatively connected to the planet carrier 108P of the fourth planetary gear set 108. Also, the planet carrier 106P of the third planetary gear set 106 is operatively connected to the sun gear 108S of the fourth planetary gear set 108. Furthermore, the input shaft 136 is selectively connectable to the sun gear 106S of the third planetary gear set 106 and to the planet carrier 108P of the fourth planetary gear set 108 by means of a third connecting mechanism 148, and selectively connectable to the ring gear 108R of the fourth planetary gear set 108 by means of a fourth connecting mechanism 150.

According to the example embodiment depicted in FIG. 5, the stationary gear ratio of each one of the first 102, second 104 and third 106 planetary gear sets are negative. The stationary gear ratio of the fourth planetary gear set 108 is however positive. According to a non-limiting example, the stationary gear ratio for each of the planetary gear sets may be as described below in Table 4.

TABLE 4

Exemplary stationary gear ratios for the embodiment depicted in FIG. 5.

| First planetary gear set (102) | Second planetary gear set (104) | Third planetary gear set (106) | Fourth planetary gear set (108) |
|---|---|---|---|
| −2.825 | −1.625 | −1.700 | 2.300 |

Figure 6:
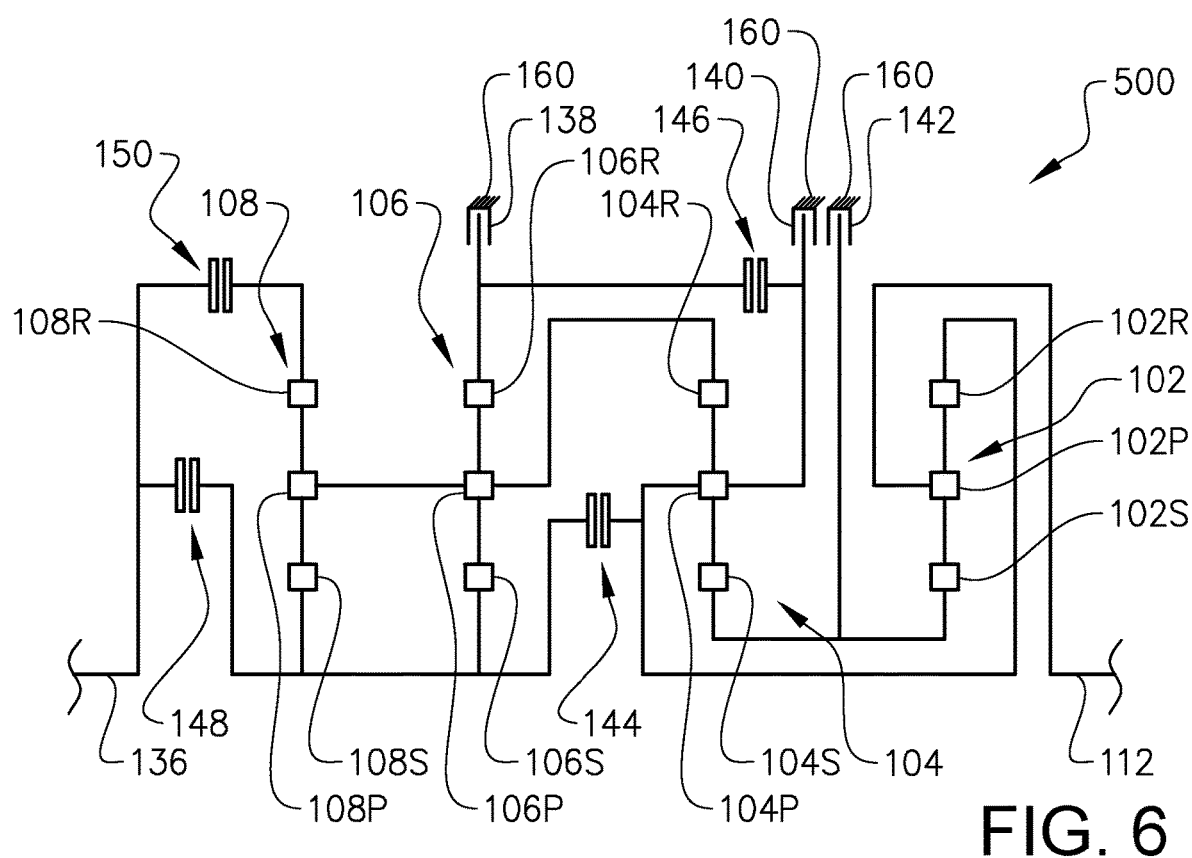

Finally, with reference to FIG. 6, another example embodiment of the transmission arrangement 500 is depicted. The transmission arrangement 500 of the example embodiment depicted in FIG. 6 is in many ways similar to the transmission arrangements described above and the following will therefore mainly describe the differences compared to those transmission arrangements.

The sun gear 106S of the third planetary gear set 106 is operatively connected to the sun gear 108S of the fourth planetary gear set 108. Also, the planet carrier 106P of the third planetary gear set 106 is operatively connected to the planet carrier 108P of the fourth planetary gear set 108. Furthermore, the input shaft 136 is selectively connectable to the sun gear 106S of the third planetary gear set 106 and to the sun gear 108S of the fourth planetary gear set 108 by means of a third connecting mechanism 148, and selectively connectable to the ring gear 108R of the fourth planetary gear set 108 by means of a fourth connecting mechanism 150.

According to the example embodiment depicted in FIG. 6, the stationary gear ratio of each one of the first 102, second 104 and third 106 planetary gear sets are negative. The stationary gear ratio of the fourth planetary gear set 108 is however positive. According to a non-limiting example, the stationary gear ratio for each of the planetary gear sets may be as described below in Table 5.

TABLE 5

Exemplary stationary ratios for the embodiment depicted in FIG. 6.

| First planetary gear set (102) | Second planetary gear set (104) | Third planetary gear set (106) | Fourth planetary gear set (108) |
|---|---|---|---|
| −2.825 | −1.625 | −1.700 | 1.770 |

Since the fourth planetary gear set 108 has a positive stationary gear ratio and the fact that the planet carrier 108P of the fourth planetary gear set 108 is operatively connected to the planet carrier 106P of the third planetary gear set 106, and that the sun gear 108S of the fourth planetary gear set 108 is operatively connected to the sun gear 106S of the third planetary gear set 106, the third 106 and fourth 108 planetary gear sets can be designed as a compound planetary gear set of Ravigneaux type.

The above described example embodiments depicted in FIGS. 2-6 are adapted to assume the gears as presented in Table 6 below. As indicated, the transmission arrangements depicted in FIGS. 2-6 assume nine forward gears and three reverse gears. In Table 6 below, the locking mechanisms are denoted simply as "Brakes" while the connecting mechanisms are denoted simply as "Clutches". A cell marked with a dot indicates an engaged state and a blank cell indicates a disengaged state. Furthermore, Table 6 also indicates non-limiting examples of the gear ratios and steps obtainable by the transmission arrangement for the various gears. The gear ratios and steps presented in Table 6 are derived from the exemplary stationary gear ratios presented in Tables 1-5 above.

TABLE 6

Shift diagram, gear ratios and steps for the different gears.

| | Brakes | | | Clutches | | | | | |
|---|---|---|---|---|---|---|---|---|---|
| Gear | 138 | 140 | 142 | 148 | 150 | 144 | 146 | Ratio | Step |
| 1 | • | | | • | • | | | 5.91 | |
| | | | | | | | | | 1.38 |
| 2 | • | | • | | • | | | 4.29 | |
| | | | | | | | | | 1.44 |
| 3 | | • | • | | | | • | 2.99 | |
| | | | | | | | | | 1.37 |
| 4 | | • | | • | • | | | 2.19 | |
| | | | | | | | | | 1.27 |
| 5 | | • | | | • | • | | 1.72 | |
| | | | | | | | | | 1.27 |
| 6 | | • | • | | | • | | 1.35 | |
| | | | | | | | | | 1.35 |
| 7 | | | • | • | | • | | 1.00 | |
| | | | | | | | | | 1.27 |
| 8 | • | | | • | | • | | 0.79 | |
| | | | | | | | | | 1.38 |
| 9 | • | | | | • | • | | 0.57 | |
| R1 | • | | • | | | | • | −6.36 | |
| | | | | | | | | | 1.38 |
| R2 | • | | | • | | | • | −4.61 | |
| | | | | | | | | | 1.96 |
| R3 | • | | • | • | | | | −2.35 | |

As depicted in Table 6 above, the transmission arrangements in FIGS. 2-6 comprise nine forward gears and three reverse gears (indicated with an R). The switching of gears can preferably be executed by one-step gear shifts or with two-step gear shifts. One-step gear shift should be understood to mean that a gear shift is executed from one gear to the next coming consecutive gear, for example, gear shift from the first gear to the second gear, from the second gear to the third gear, from the third gear to the second gear, etc. Two-step gear shift should be understood to mean that a gear shift is executed to exclude a next coming consecutive gear, for example, gear shift from the first gear to the third gear, from the second gear to the fourth gear, from the third gear to the first gear, etc.

As can be seen from Table 6, one-step gear shifting includes only single shifts of the connecting mechanisms and the locking mechanisms, i.e. when executing one-step gear shifts, only one of the connecting mechanisms/locking mechanisms is shifted from an engaged state to a disengaged state, and only one of the connecting mechanisms/locking mechanisms is shifted from a disengaged state to an engaged state. As an example, when shifting from the first gear to the second gear, it is only the third connecting mechanism 148 that is changed from an engaged state to a disengaged state, and only the fourth connecting mechanism 150 that is changed from a disengaged state to an engaged state.

Furthermore, and as is depicted in Table 6, there is only one occasion during two-step gear shifts where double shift occurs. Double shift should be understood to mean that two connecting mechanisms/locking mechanisms are changed from an engaged state to a disengaged state, and two connecting mechanisms/locking mechanisms are changed from a disengaged state to an engaged state. For two-step gear shifts, this occurs when shifting from the first gear to the third gear, or vice versa from the third gear to the first gear. When shifting from the first gear to the third gear, the first locking mechanism 138 and the third connecting mechanism 148 are changed from an engaged state to a disengaged state, and the first 146 and the fourth 150 connecting mechanisms are changed from a disengaged state to an engaged state.

An advantage of the transmission arrangement is hence that the shiftability is improved since a reduced number of connecting mechanisms/locking mechanisms need activation/deactivation during gear shifting. In detail, during one-step gear shifting only single shifts occur and during two-step gear shifting only one double shift occurs, which is when shifting gears between the first and third forward gears of the transmission arrangement.

Furthermore, it should also be noted from Table 6 that the second locking mechanism 140 is positioned in a disengaged state for all the forward gears and positioned in an engaged state for all of the reverse gears. Hence, the second locking mechanism 140 may be designed as a dog clutch.

Moreover, with the above described example embodiments of the transmission arrangement, further alternative gears are obtainable. Table 7 below illustrates alternative gears which are possible to obtain by the connecting mechanisms and locking mechanisms depicted and described above.

In Table 7, gear 2.5* is an additional gear with a gear ratio between the gear ratios of the second and third gears. Also, reverse gear R4* is an additional gear having a reduced gear ratio compared to the third reverse gear, i.e. reverse gear R4* is a faster reverse gear compared to the third reverse gear. The remaining gears marked with one or more stars in Table 7 are alternative gears for the already present gears. For example, gears 7*, 7 and 7* all have the same gear ratio as the seventh gear and are thus alternative gears to the seventh gear. Similarly, the alternative gears R1* and R1** have the same gear ratio as the first reverse gear R1 and R2* and R2** have the same gear ratio as the second reverse gear R2.

If using the above described nine forward gears depicted in Table 6 with the additional gear 2.5* depicted in Table 7, only single shifts occur for two-step gear shifts and one double shift occurs for one-step gear shifts. The double shift for the one-step gear shift occurs when shifting from the second gear to gear 2.5*, wherein the first locking mechanism 138 and the fourth connecting mechanism 150 are changed from an engaged state to a disengaged state, and the first 146 and the third 148 connecting mechanisms are changed from a disengaged state to an engaged state.

TABLE 7

Shift diagram, gear ratios and steps for the different gears.

| | Brakes | | | Clutches | | | | | |
|---|---|---|---|---|---|---|---|---|---|
| Gear | 138 | 140 | 142 | 148 | 150 | 144 | 146 | Ratio | Step |
| 1 | • | | • | • | | | | 5.91 | |
| | | | | | | | | | 1.38 |
| 2 | • | | • | | • | | | 4.29 | |
| | | | | | | | | | 1.19 |
| 2.5* | | • | • | | | | • | 3.60 | |
| | | | | | | | | | 1.21 |
| 3 | | | • | • | | | • | 2.99 | |
| | | | | | | | | | 1.37 |
| 4 | | | • | • | • | | | 2.19 | |
| | | | | | | | | | 1.27 |
| 5 | | | • | | • | • | | 1.72 | |
| | | | | | | | | | 1.27 |
| 6 | | • | | | • | • | | 1.35 | |
| | | | | | | | | | 1.35 |
| 7 | | • | | | | • | • | 1.00 | |
| | | | | | | | | | 1.00 |
| 7* | | | • | | | • | • | 1.00 | |
| | | | | | | | | | 1.00 |
| 7** | | • | | | | • | • | 1.00 | |
| | | | | | | | | | 1.00 |
| 7*** | | • | | | • | | • | 1.00 | |
| | | | | | | | | | 1.27 |
| 8 | • | | | | • | • | | 0.79 | |
| | | | | | | | | | 1.38 |
| 9 | • | | | • | • | | | 0.57 | |
| R1 | • | | • | | | | • | −6.36 | |
| | | | | | | | | | 1.00 |
| R1* | • | • | | • | | | | −6.36 | |
| | | | | | | | | | 1.00 |
| R1** | • | | • | | | | • | −6.36 | |
| | | | | | | | | | 1.38 |
| R2 | | | • | • | | | • | −4.61 | |
| | | | | | | | | | 1.00 |
| R2* | • | • | | • | | | | −4.61 | |
| | | | | | | | | | 1.00 |
| R2** | • | | | • | | | • | −4.61 | |
| | | | | | | | | | 1.96 |
| R3 | • | | | • | • | | | −2.35 | |
| | | | | | | | | | 2.30 |
| R4* | • | | | • | | | • | −1.02 | |

Hence, with the transmission arrangements depicted and described in relation to FIGS. 2-6, a plurality of additional and alternative gears can be achieved. A further advantage is thus that the transmission arrangement according to the present invention has an increased variability when choosing the gears to be used. Thus, a plurality of alternatives is possible when designing gear shifting of the transmission arrangement.

It is to be understood that the present invention is not limited to the embodiments described above and illustrated in the drawings; rather, the skilled person will recognize that many changes and modifications may be made within the scope of the appended claims. For example, although the present invention has mainly been described in relation to an articulated hauler, the invention should be understood to be equally applicable for any type of vehicle.

The invention claimed is:

1. A transmission arrangement for a vehicle, the transmission arrangement comprising a first, a second, a third, and a fourth planetary gear set comprising a sun gear, a planet carrier and a ring gear, respectively, wherein the transmission arrangement further comprises a transmission housing, an input shaft and an output shaft, wherein the planet carrier of the first planetary gear set and the output shaft are operatively connected to each other;

the ring gear of the first planetary gear set and the planet carrier of the second planetary gear set are operatively connected to each other;

the sun gear of the first planetary gear set and the sun gear of the second planetary gear set are operatively connected to each other; and the ring gear of the second planetary gear set and the planet carrier of the third planetary gear set are operatively connected to each other, wherein one of the sun gear, the planet carrier and the ring gear of the fourth planetary gear set is operatively connected to one of the input shaft, the sun gear, the planet carrier and the ring gear of the third planetary gear set,
wherein another one of the sun gear, the planet carrier and the ring gear of the fourth planetary gear set is operatively connected to one of the input shaft, the sun gear, the planet carrier and the ring gear of the third planetary gear set,
wherein the transmission arrangement comprises a first connecting mechanism for selectively connecting the planet carrier of the second planetary gear set to the ring gear of the third planetary gear set, and
wherein the transmission arrangement comprises a second connecting mechanism for selectively connecting the sun gear of the third planetary gear set to the planet carrier of the second planetary gear set and to the ring gear of the first planetary gear set.

2. The transmission arrangement according to claim 1, wherein the transmission arrangement comprises a first locking mechanism for selectively locking the ring gear of the third planetary gear set to the transmission housing.

3. The transmission arrangement according to claim 1, wherein the transmission arrangement comprises a second locking mechanism for selectively locking the planet carrier of the second planetary gear set to the transmission housing.

4. The transmission arrangement according to claim 3, wherein the second locking mechanism is a dog clutch.

5. The transmission arrangement according to claim 1, wherein the transmission arrangement comprises a third locking mechanism for selectively locking the sun gear of the second planetary gear set and the sun gear of the first planetary gear set to the transmission housing.

6. The transmission arrangement according to claim 1, wherein a stationary gear ratio of each one of the first, second and third planetary gear sets are negative.

7. The transmission arrangement according to claim 1, wherein
the sun gear of the fourth planetary gear set is operatively connected to the ring gear of the third planetary gear set; and
the ring gear of the fourth planetary gear set is operatively connected to the sun gear of the third planetary gear set.

8. The transmission arrangement according to claim 1, wherein the transmission arrangement comprises a third connecting mechanism for selectively connecting the input shaft to the ring gear of the fourth planetary gear set and to the sun gear of the third planetary gear set, and a fourth connecting mechanism for selectively connecting the input shaft to the planet carrier of the fourth planetary gear set.

9. The transmission arrangement according to claim 1, wherein
the planet carrier of the fourth planetary gear set is operatively connected to the input shaft; and
the sun gear of the fourth planetary gear set is operatively connected to the ring gear of the third planetary gear set.

10. The transmission arrangement according to claim 1, wherein the transmission arrangement comprises a third connecting mechanism for selectively connecting the input shaft to the sun gear of the third planetary gear set and a fourth connecting mechanism for selectively connecting the ring gear of the fourth planetary gear set to the sun gear of the third planetary gear set.

11. The transmission arrangement according to claim 1, wherein
the input shaft is operatively connected to the planet carrier of the fourth planetary gear set; and
the ring gear of the fourth planetary gear set is operatively connected to the sun gear of the third planetary gear set.

12. The transmission arrangement according to claim 1, wherein the transmission arrangement comprises a third connecting mechanism for selectively connecting the sun gear of the fourth planetary gear set to the input shaft and to the planet carrier of the fourth planetary gear set, and a fourth connecting mechanism for selectively connecting the sun gear of the fourth planetary gear set to the ring gear of the third planetary gear set.

13. The transmission arrangement according to claim 1, wherein a stationary gear ratio for the fourth planetary gear set is negative.

14. The transmission arrangement according to claim 1, wherein
the planet carrier of the fourth planetary gear set is operatively connected to the sun gear of the third planetary gear set; and
the sun gear of the fourth planetary gear set is operatively connected to the planet carrier of the third planetary gear set.

15. The transmission arrangement according to claim 1, wherein the transmission arrangement comprises a third connecting mechanism for selectively connecting the input shaft to the planet carrier of the fourth planetary gear set and to the sun gear of the third planetary gear set, and a fourth connecting mechanism for selectively connecting the input shaft to the ring gear of the fourth planetary gear set.

16. The transmission arrangement according to claim 1, wherein
the planet carrier of the fourth planetary gear set is operatively connected to the planet carrier of the third planetary gear set; and
the sun gear of the fourth planetary gear set is operatively connected to the sun gear of the third planetary gear set.

17. The transmission arrangement according to claim 1, wherein the transmission arrangement comprises a third connecting mechanism for selectively connecting the input shaft to the sun gear of the fourth planetary gear set and to the sun gear of the third planetary gear set, and a fourth connecting mechanism for selectively connecting the input shaft to the ring gear of the fourth planetary gear set.

18. The transmission arrangement according to claim 1, wherein a stationary gear ratio for the fourth planetary gear set is positive.

19. A vehicle comprising a prime mover and a gearbox, wherein the gearbox comprises a transmission arrangement according to claim 1.

* * * * *